US008923831B2

(12) United States Patent
Salkintzis

(10) Patent No.: US 8,923,831 B2
(45) Date of Patent: Dec. 30, 2014

(54) METHODS AND APPARATUS FOR GENERATING A MESSAGE FOR A WIRELESS DEVICE

(71) Applicant: Motorola Mobility LLC, Libertyville, IL (US)

(72) Inventor: Apostolis K. Salkintzis, Athens (GR)

(73) Assignee: Google Inc., Mountain View, CA (US)

( * ) Notice: Subject to any disclaimer, the term of this patent is extended or adjusted under 35 U.S.C. 154(b) by 58 days.

(21) Appl. No.: 13/738,384

(22) Filed: Jan. 10, 2013

(65) Prior Publication Data

US 2014/0194153 A1    Jul. 10, 2014

(51) Int. Cl.
*H04M 3/42*      (2006.01)
*H04W 4/12*      (2009.01)
*H04L 12/18*     (2006.01)
*H04L 12/58*     (2006.01)

(52) U.S. Cl.
CPC ............... *H04W 4/12* (2013.01); *H04L 12/189* (2013.01); *H04L 12/588* (2013.01); *H04L 12/1859* (2013.01)
USPC ......... 455/414.2; 455/466; 455/411; 709/225

(58) Field of Classification Search
CPC ..... H04W 48/16; H04W 12/06; H04W 84/12; H04W 48/20
USPC ............. 455/466, 414.1–414.2, 411; 709/225
See application file for complete search history.

(56) References Cited

U.S. PATENT DOCUMENTS

| | | | |
|---|---|---|---|
| 2003/0037108 A1* | 2/2003 | Peiffer et al. ............... | 709/203 |
| 2005/0033656 A1* | 2/2005 | Wang et al. ................. | 705/26 |
| 2008/0119177 A1* | 5/2008 | Hovnanian et al. ......... | 455/414.2 |
| 2008/0195741 A1* | 8/2008 | Wynn et al. ................. | 709/229 |
| 2010/0061294 A1* | 3/2010 | Proctor et al. .............. | 370/328 |
| 2010/0080202 A1* | 4/2010 | Hanson ....................... | 370/338 |
| 2010/0266125 A1* | 10/2010 | Tanaka et al. ............... | 380/270 |
| 2011/0312344 A1 | 12/2011 | McCahill et al. | |
| 2012/0078726 A1 | 3/2012 | Black et al. | |
| 2012/0135711 A1* | 5/2012 | Jabara et al. ................ | 455/411 |

(Continued)

FOREIGN PATENT DOCUMENTS

| | | |
|---|---|---|
| FR | 2920937 A1 | 3/2009 |
| WO | 2006077283 A1 | 7/2006 |

OTHER PUBLICATIONS

Kevin: Innovations in WiFi to bring you closer to your customers, http://www.nextgenevents.co.uk/cms/files/pdf/roadshows2012/scotland/Kevin%20Bonanno.pdf, BSkyB Company, Jun. 7, 2012, all pages.

(Continued)

*Primary Examiner* — Nathan Taylor

(57) ABSTRACT

Methods and apparatus for generating a message (106) for a wireless device (102) are disclosed. In an embodiment, an application server (106), or any other suitable device or system, receives a wireless network identifier (e.g. an SSID) associated with an access point (202) communicatively coupled to the wireless device (102). The application server (106) determines a social networking account associated with the network identifier (e.g., company XYZ's Facebook account from a local database). The application server (106) then retrieves content from a network (110) based on the social networking account (e.g., company XYZ's ten most recent Facebook posts), and generates the message (106) for the wireless device (102) based on the content (e.g., "Welcome to XYZ! Today's special offer is . . . ").

25 Claims, 10 Drawing Sheets

(56) References Cited

U.S. PATENT DOCUMENTS

| | | |
|---|---|---|
| 2012/0190325 A1 | 7/2012 | Abu-Hakima et al. |
| 2012/0246247 A1* | 9/2012 | Lim et al. .................. 709/206 |
| 2013/0079036 A1* | 3/2013 | Sharet ...................... 455/456.3 |
| 2013/0159079 A1* | 6/2013 | Singh et al. ............... 705/14.19 |
| 2013/0198383 A1* | 8/2013 | Tseng et al. ............... 709/225 |

OTHER PUBLICATIONS

Patent Cooperation Treaty, International Search Report and Written Opinion of the International Searching Authority for International Application No. PCT/US2013/078252, Apr. 30, 2014, 8 pages.

* cited by examiner

US 8,923,831 B2

METHODS AND APPARATUS FOR GENERATING A MESSAGE FOR A WIRELESS DEVICE

The present disclosure relates in general to wireless communication devices, and, in particular, to methods and apparatus for generating a message for a wireless device.

BACKGROUND OF THE INVENTION

Wireless devices, such as smart phones, often connect automatically to different Wi-Fi hotspots as the devices move from one location to another location. These hotspots are often provided for free by various businesses such as coffee shops, restaurants, and hotels. When a wireless device initially attempts to browse to a web page (e.g., Google.com), the hotspot provider's access point may cause the user's browser to be redirected to a web page promoting the hotspot provider (e.g., Starbucks.com). This web page is typically referred to as a welcome page. This brief marketing opportunity is beneficial to the hotspot provider.

However, some hotspots do not support these welcome pages. In addition, the welcome page is only displayed immediately after the user connects to the hotspot via a browser. There are no updated messages pushed to the user during the hotspot session. Further, many newer hotspots do not use a web browser for authentication. Therefore, the browser redirection technique to present a welcome page does not work.

DETAILED DESCRIPTION OF THE PREFERRED EMBODIMENTS

Figure 1:
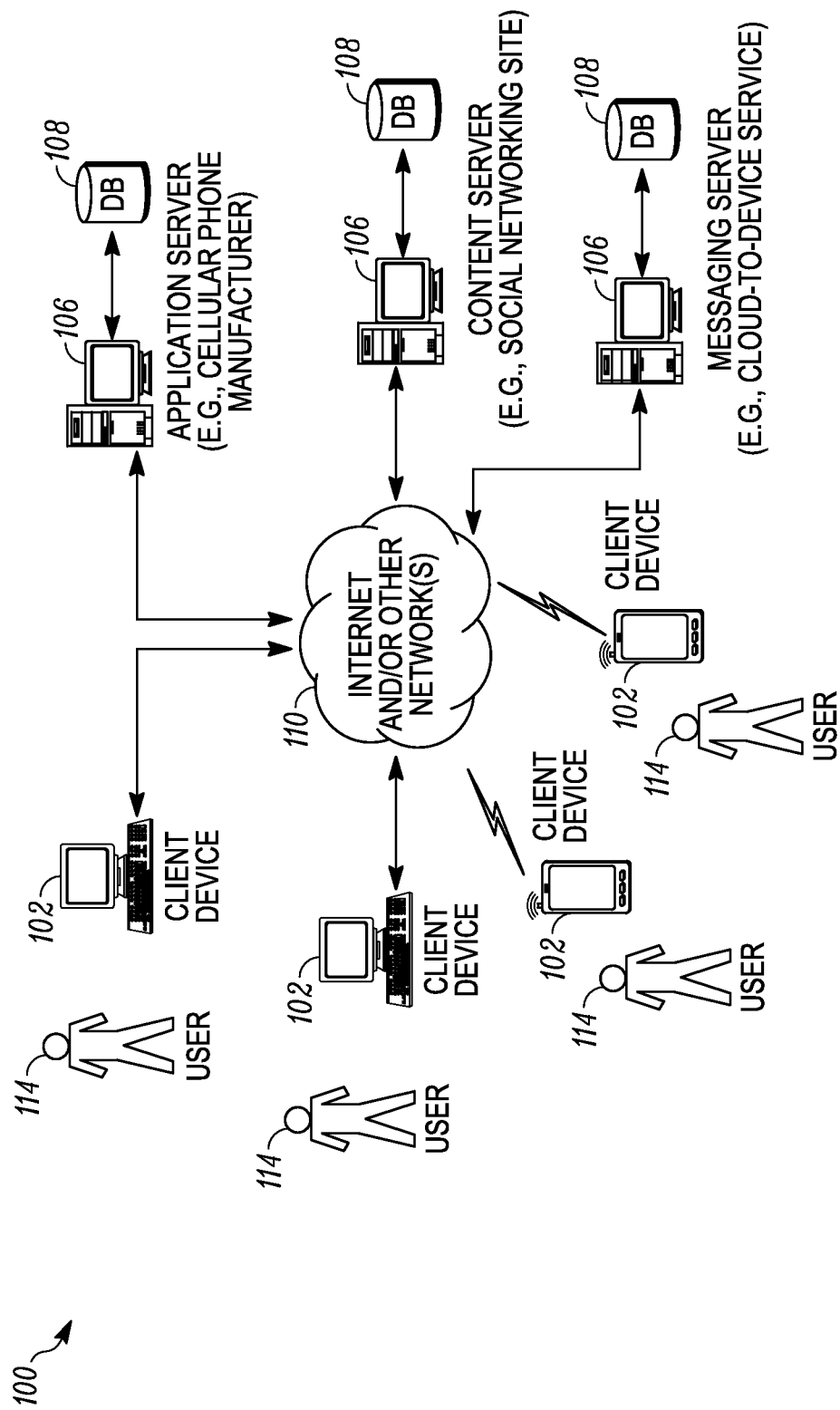
FIG. 1 is a block diagram of an example network communication system.

Briefly, in a specific embodiment, an application server associated with a cellular phone manufacturer receives a Service Set Identifier (SSID) from a cellular phone. The SSID identifies a Wi-Fi hotspot that is currently connecting the cellular phone to the Internet (e.g., "ABC Hotel Lobby"). The application server then looks up what Facebook and/or other social networking account is associated with the SSID (e.g., lookup in a database that "ABC Hotel Lobby" is associated with the Facebook account "ABC Hotels and Resorts"). The application server then logs in to Facebook as a user that "likes" the social networking account of the hotspot provider and retrieves social networking content (e.g., ABC Hotel's ten most recent Facebook posts). The application server then optionally parses the content (e.g., selects the most recent post, a post based on a keyword and/or hash tag, and/or a post based on a user associated with the post) and composes a message from the retrieved (and optionally parsed) social networking content. The application server then optionally adds additional content to the message (e.g., a welcome message and or a hyperlink), and sends the composed message (e.g., "Welcome to ABC! Today's special offer is . . . ") either directly to the wireless device or to the wireless device via a messaging server.

Among other advantages, wireless devices using hotspots that do not support browser based redirection to welcome pages may display these messages as welcome messages. In addition, updated messages may be pushed to the wireless devices during the hotspot session. For example, messages may be pushed to the wireless devices when the social networking content changes while the wireless device is connected to the hotspot associated with the social networking content. Because the content of the messages is derived from the hotspot provider's social networking account, the messages may be pushed to the wireless device with no additional effort or cooperation needed by the hotspot provider.

In an embodiment, an apparatus for generating a message for a wireless device is disclosed. The apparatus includes a receiver structured to receive a wireless network identifier associated with an access point communicatively coupled to the wireless device (e.g., Wi-Fi SSID is "ABC Hotel Lobby"). The apparatus also includes a controller operatively coupled to the receiver. The controller is structured to determine a social networking account associated with the network identifier (e.g., look in database for "ABC Hotel Lobby" to determine Facebook account is "ABC Suites"). The apparatus also includes a network interface operatively coupled to the controller. The network interface is structured to retrieve content from a network based on the social networking account, wherein the controller generates the message for the wireless device based on the retrieved content (e.g., get most recent Facebook post for "ABC Suites" and send to the wireless device as a pop up message).

In one example, the receiver is structured to receive a Service Set Identifier (SSID). In one example, the controller is structured to lookup a uniform resource locator (URL) based on the network identifier. In one example, the controller is structured to lookup a social networking account based on the network identifier. In one example, the network interface is structured to retrieve web page content based on the social networking account. In one example, the controller is structured to generate the message by parsing the content based on at least one keyword. In one example, the controller is structured to generate the message by filtering the content based on a posted date. In one example, the controller is structured to generate the message by filtering the content based on a user associated with posting the content. In one example, a transmitter is operatively coupled to the controller, the transmitter being structured to send the message to the wireless device. In one example, the transmitter is structured to update the message at the wireless device. In one example, the transmitter is part of a messaging push server.

Turning now to the drawings, and as described in detail below, one example of the presently disclosed system is realized in a wireless network communications system, although any suitable communication system may be employed. A block diagram of an exemplary wireless network communications system 100 is illustrated in FIG. 1. The illustrated system 100 includes one or more client devices 102 (e.g., computer, television, camera, phone), one or more servers 106, and one or more databases 108. Each of these devices may communicate with each other via a connection to one or more communications channels 110 such as the Internet or some other wired and/or wireless data network, including, but not limited to, any suitable wide area network or local area network. It will be appreciated that any of the devices described herein may be directly connected to each other instead of over a network.

Each server 106 stores a plurality of files, programs, and/or web pages in one or more databases 108 for use by the client devices 102 as described in detail below. The database 108 may be connected directly to the server 106 and/or via one or more network connections. The database 108 stores data as described in detail below.

One server 106 typically interacts with a large number of client devices 102. Accordingly, each server 106 is typically a high end computer with a large storage capacity, one or more fast microprocessors, and one or more high speed network connections. Conversely, relative to a typical server 106, each client device 102 typically includes less storage capacity, a single microprocessor, and a single network connection.

In this example, the system 100 includes an application server 106, a content server 106, and a messaging server 106. Each of the servers 106 is embodied in a single device or a plurality of devices. In an example, the application server 106 is combined with the content server 106 and/or the messaging server 106. In another example, the content server 106 is combined with the messaging server 106. In yet another example, the application server 106, the content server 106, and/or the messaging server 106 include a plurality of servers and/or other devices.

As described in more detail below, and with respect to one embodiment, the application server 106 (a) receives a wireless network identifier (e.g. an SSID) from a wireless device 102, (b) retrieves social networking account information based on the network identifier (e.g., company XYZ's Facebook account from a local database), (c) retrieves social networking content from a content server 106 based on the social networking account (e.g., company XYZ's ten most recent Facebook posts), (d) parses the content (e.g., select a post based on a keyword and/or hash tag), and (e) composes a message based on the parsed content and sends the message to the wireless device 102 either directly to the wireless device 102 or via a messaging server 106 (e.g., "Welcome to XYZ! Today's special offer is . . . ").

Figure 2:
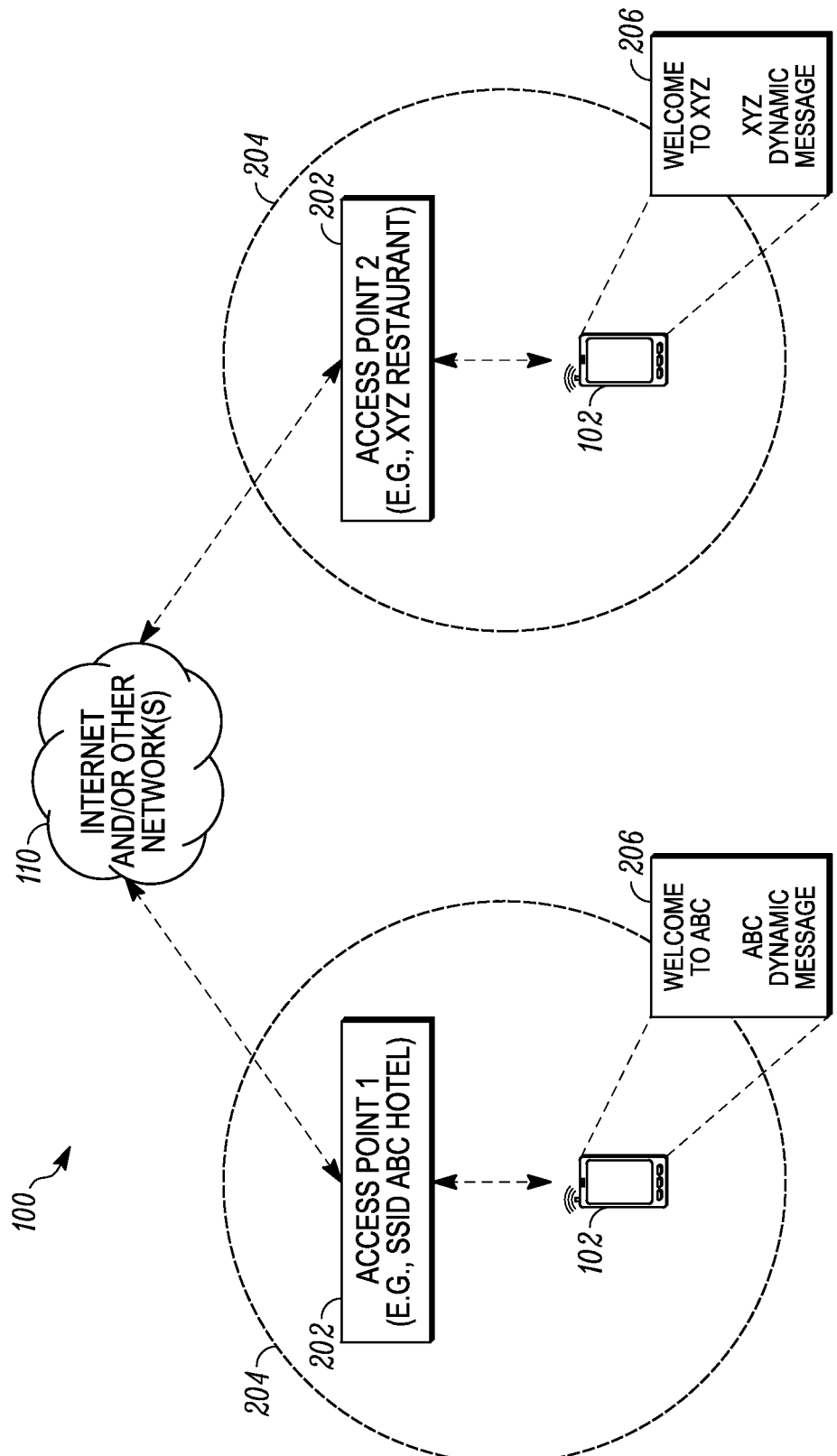
FIG. 2 is a block diagram of another example network communication system.

A block diagram of another example network communication system 100 is illustrated in FIG. 2. In this example, two different access points 202 are located at two different business locations. In a first example, an 802.11 Wi-Fi router is located at a hotel named ABC Hotel. In a second example, another 802.11 Wi-Fi router is located at a restaurant named XYZ Restaurant. Each access point 202 has a wireless range 204. Wireless devices 102 within an access point's range 204 may connect to (or associate with) that access point 202.

As part of this association process, each wireless device 102 receives an access point identifier (e.g., an SSID). For example, the ABC Hotel Wi-Fi router may use "ABC Hotel" as its SSID, and the XYZ Restaurant Wi-Fi router may use "XYZ Rest Group" as its SSID. As described in more detail below, and with respect to one embodiment, each wireless device 102 displays a dynamic and customized message 206 based on the network identifier. For example, a first wireless device 102 using the ABC Hotel Wi-Fi may receive a message 206 such as "Welcome to ABC, please visit our spa located on the second floor," and a second wireless device 102 using the XYZ Restaurant Wi-Fi may receive a message 206 such as "Welcome to XYZ, our specials today include . . . "

Each message 206 may change at any time, and the wireless device 102 may receive an updated message 206 any time the wireless device 102 is connected to the access point 202. For example, a wireless device 102 connecting to Wi-Fi supplied by a horse racing track may initially display the message 206 "Welcome to Arlington Race Track!" Subsequently, the wireless device 102 may display the message 206 "Only ten minutes left to place your bets on race #1. Click here to place your bets." After the race, the wireless device 102 in this example may display the message 206 "Win, place and show for race #1 are horse numbers 5, 2, and 1 respectively."

In order to dynamically adjust the content that is displayed for each business, some or all of the content is retrieved from a social networking site, or any other suitable web site, associated with that business. In one embodiment, the business associated with the access point 202 is unaware that the content from its social networking site is used to create messages that are being pushed to wireless device 102. In such an instance, the social networking content may be parsed based on date, keywords, user's posting the content, and/or any other suitable parsing criteria, to generate some or all of the desired message content. In another embodiment, the business associated with the access point 202 is aware that the content from its social networking site is used to create messages that are being pushed to wireless device 102. In such an instance, the social networking content may include one or more hash tags (or other identifiers) to identify some or all of the desired content that should be pushed to wireless device 102.

Figure 3:
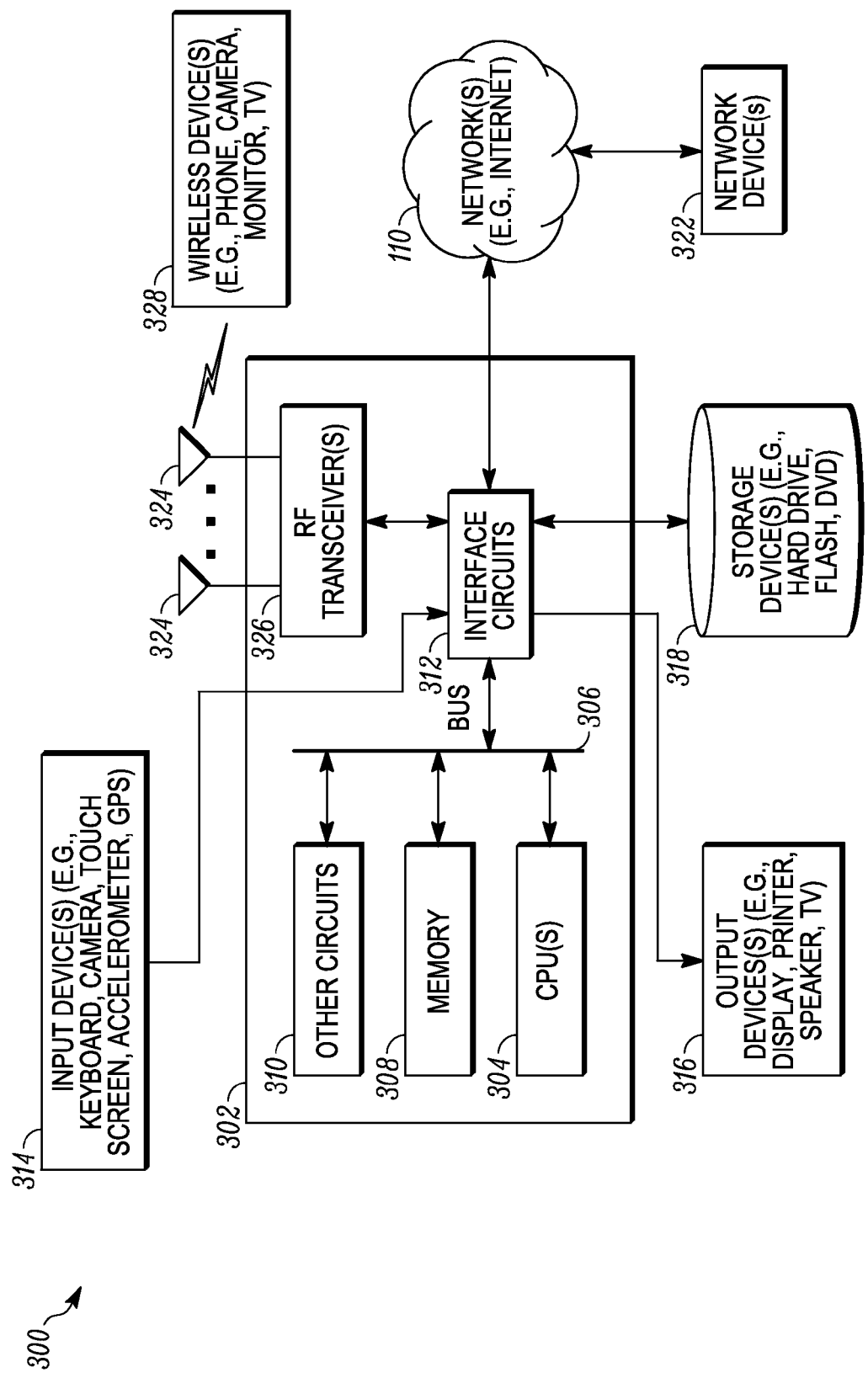
FIG. 3 is a block diagram of an example apparatus for generating a message for a wireless device.

Each of the devices illustrated in FIG. 1 and FIG. 2 may include certain common aspects of many electronic devices such as microprocessors, memories, peripherals, etc. A block diagram of certain elements of an example electronic device 300 that may be used to generate a message for a wireless device is illustrated in FIG. 3. For example, the electrical device 300 may be a client, a server, a camera, a phone, and/or a television.

The example electrical device 300 includes a main unit 302 which may include, if desired, one or more physical processors 304 electrically coupled by an address/data bus 306 to one or more memories 308, other computer circuitry 310, and one or more interface circuits 312. The processor 304 may be any suitable processor or plurality of processors. For example, the electrical device 300 may include a central processing unit (CPU) and/or a graphics processing unit (GPU). The memory 308 may include various types of non-transitory memory including volatile memory and/or non-volatile memory such as, but not limited to, distributed memory, read-only memory (ROM), random access memory (RAM) etc. The memory 308 typically stores a software program that interacts with the other devices in the system as described herein. This program may be executed by the processor 304 in any suitable manner. The memory 308 may also store digital data indicative of documents, files, programs, web pages, etc. retrieved from a server and/or loaded via an input device 314.

The interface circuit 312 may be implemented using any suitable interface standard, such as an Ethernet interface and/or a Universal Serial Bus (USB) interface. One or more input devices 314 may be connected to the interface circuit 312 for entering data and commands into the main unit 302. For example, the input device 314 may be a keyboard, mouse, touch screen, track pad, isopoint, camera, voice recognition system, accelerometer, global positioning system (GPS), and/or any other suitable input device.

One or more displays, printers, speakers, monitors, televisions, high definition televisions, and/or other suitable output devices 316 may also be connected to the main unit 302 via the interface circuit 312. The display 316 may be a cathode ray tube (CRTs), liquid crystal displays (LCDs), or any other type of suitable display. The display 316 generates visual displays of data generated during operation of the device 300. For example, the display 316 may be used to display web pages and/or other content received from a server 106. The visual displays may include prompts for human input, run time statistics, calculated values, data, etc.

One or more storage devices 318 may also be connected to the main unit 302 via the interface circuit 312. For example, a hard drive, CD drive, DVD drive, and/or other storage devices may be connected to the main unit 302. The storage devices 318 may store any type of data used by the device 300.

The electrical device 300 may also exchange data with other network devices 322 via a connection to a network. The network connection may be any type of network connection, such as an Ethernet connection, digital subscriber line (DSL), telephone line, coaxial cable, etc. Users of the system may be required to register with a server. In such an instance, each user may choose a user identifier (e.g., e-mail address) and a password which may be required for the activation of services. The user identifier and password may be passed across the network using encryption built into the user's browser. Alternatively, the user identifier and/or password may be assigned by the server.

In some embodiments, the device 300 is a wireless device. In such an instance, the device 300 may include one or more antennas 324 connected to one or more radio frequency (RF) transceivers 326. The transceiver 326 may include one or more receivers and one or more transmitters. For example, the transceiver 326 may be a cellular transceiver. The transceiver 326 allows the device 300 to exchange signals, such as voice, video and data, with network servers (e.g. with server 106 shown in FIG. 1) and/or with other wireless devices 328, such as a phone, camera, monitor, television, and/or high definition television. For example, the device may send and receive wireless telephone signals, text messages, audio signals and/or video signals. A receive signal strength indicator (RSSI) associated with each receiver generates an indication of the relative strength or weakness of each signal being received by the device 300.

Figure 4:
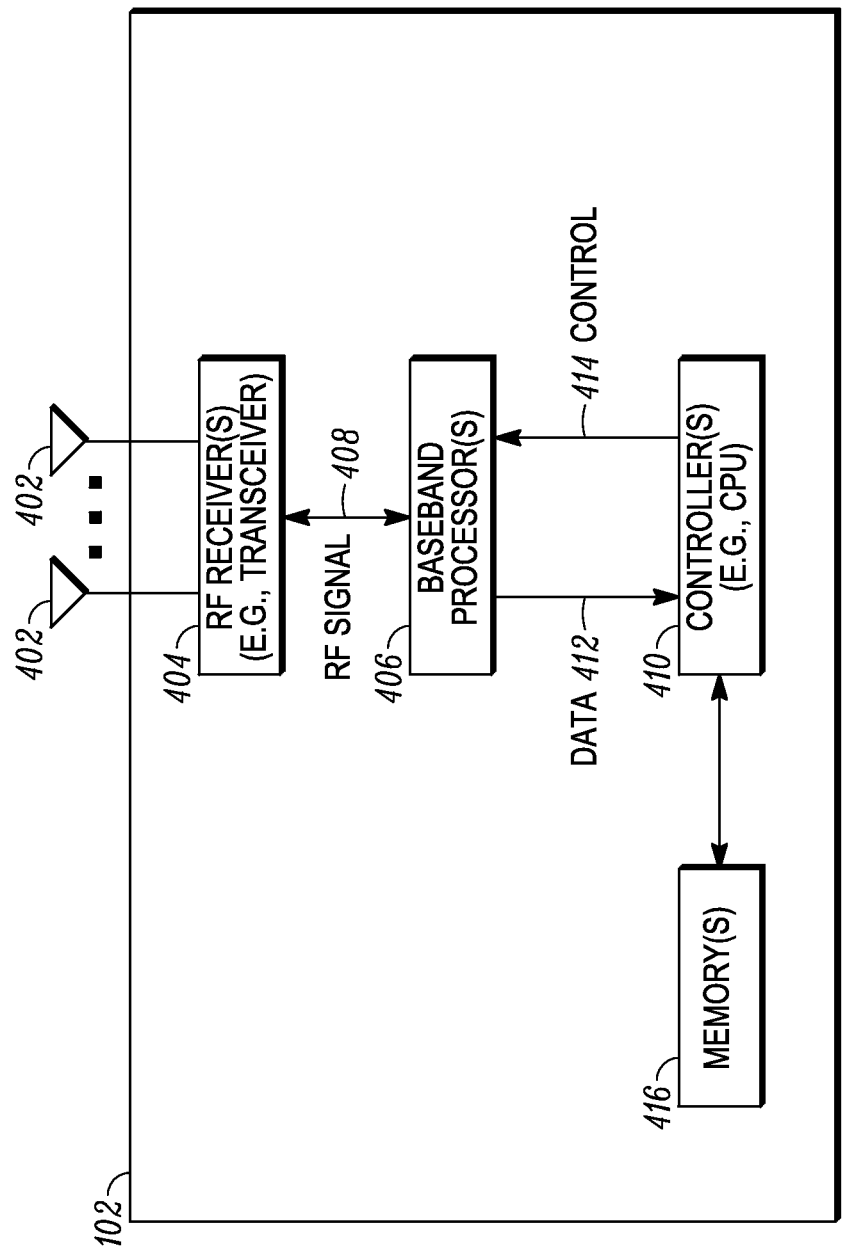
FIG. 4 is a block diagram of another example apparatus for generating a message for a wireless device.

A block diagram of certain elements of an example wireless device 102 for generating a message is illustrated in FIG. 4. The wireless device 102 may be implemented in hardware or a combination of hardware and hardware executing software. In one embodiment, the wireless device 102 may include a CPU executing software. Other suitable hardware may include one or more application specific integrated circuits (ASICs), state machines, field programmable gate arrays (FPGAs), and/or digital signal processors (DSPs).

In this example, the wireless device 102 includes a plurality of antennas 402 operatively coupled to one or more radio frequency (RF) receivers 404. The receiver 404 is also operatively coupled to one or more baseband processors 406. The receiver 404 tunes to one or more radio frequencies to receive one or more radio signals 408, which are passed to the baseband processor 406 in a well known manner. The baseband processor 406 is operatively coupled to one or more controllers 410. The baseband processor 406 passes data 412 to the controller 410. A memory 416 operatively coupled to the controller 410 may store the data 412.

Figure 5:
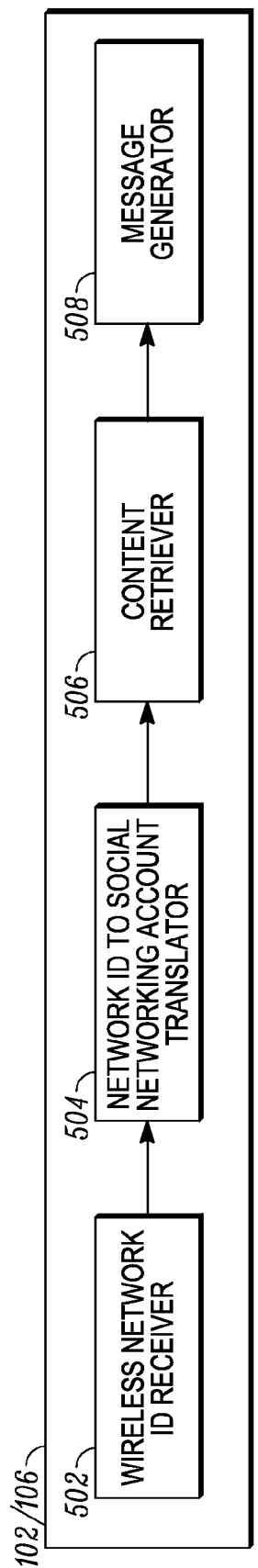
FIG. 5 is a block diagram of yet another example apparatus for generating a message for a wireless device.

A block diagram of certain elements of another example electronic device 102/106 for generating a message for a wireless device is illustrated in FIG. 5. In this example, the electronic device 102/106 includes a wireless network identifier receiver 502. For example, the wireless network identifier receiver 502 may be an 802.11 Wi-Fi receiver, which receives a Service Set Identifier (SSID) from an access point 202. The wireless network identifier receiver 502 is operatively coupled to a translator 504 for converting the network identifier to a social networking account. For example, the translator 504 may be a processor 304 in a cellular phone 102 and/or an application server 106 executing software that looks up Facebook account information in a database 108 based on the a Service Set Identifier (SSID). Although Facebook is used throughout this description as an example social network, it will be appreciated that any suitable social network may be used, such as Twitter, Google+, etc.

The translator 504 is operatively coupled to a content retriever 506. The content retriever 506 retrieves social networking content from a content server 106 based on the social networking account. In an example, SSID identifies a certain company, and the content retriever 506 retrieves one or more Facebook posts from that company's Facebook page. The content retriever 506 is operatively coupled to a message generator 508. The message generator 508 generates a message for a wireless device 102 based on the retrieved social networking content. In an embodiment, the message generator 508 parses the retrieved social networking content to generate at least a portion of the message. For example, the message generator 508 may select a certain social networking post out of a plurality of posts based on one or more keywords, one or more hash tags, and/or one or more poster's names. In addition, the message generator 508 may add certain content to the message that was not necessarily retrieved from the social networking account. For example, the message generator 508 may add information associated with the network identifier in the database, such as the company name, a company logo, a coupon, etc. In addition, the message generator 508 may add one or more hyperlinks and/or any other suitable content to the message.

In one embodiment, the blocks 502-508 of the apparatus illustrated in FIG. 5 are part of one or more servers 106. In such an instance, the server 106 transmits the generated message to a wireless device 102, and the wireless device 102 displays the message on a display 316 and/or other output device. For example, the application server 106 and/or a messaging server 106 may send "Welcome to ABC! Sign up for an account today by clicking here" to a wireless device 102 for display on the device 102. In another embodiment, the blocks 502-508 of the apparatus illustrated in FIG. 5 are part of a wireless device 102, such as a cellular phone. In such an instance, the wireless device 102 displays the generated message on the display 316 and/or other output device. In yet another embodiment, some of the blocks 502-508 of the apparatus illustrated in FIG. 5 are part one or more servers 106 and some of the blocks 502-508 are part of a wireless device 102. For example, an application server 106 may receive the network identifier, look up social networking account information based on the network identifier, generate a first portion of the message, include a pointer (e.g., a hyperlink) to a second portion of the message, and send the first portion of the message and the pointer to a wireless device 102. In such an instance, the wireless device 102 then retrieves the second portion of the message automatically or in response to a user input.

Figure 6:
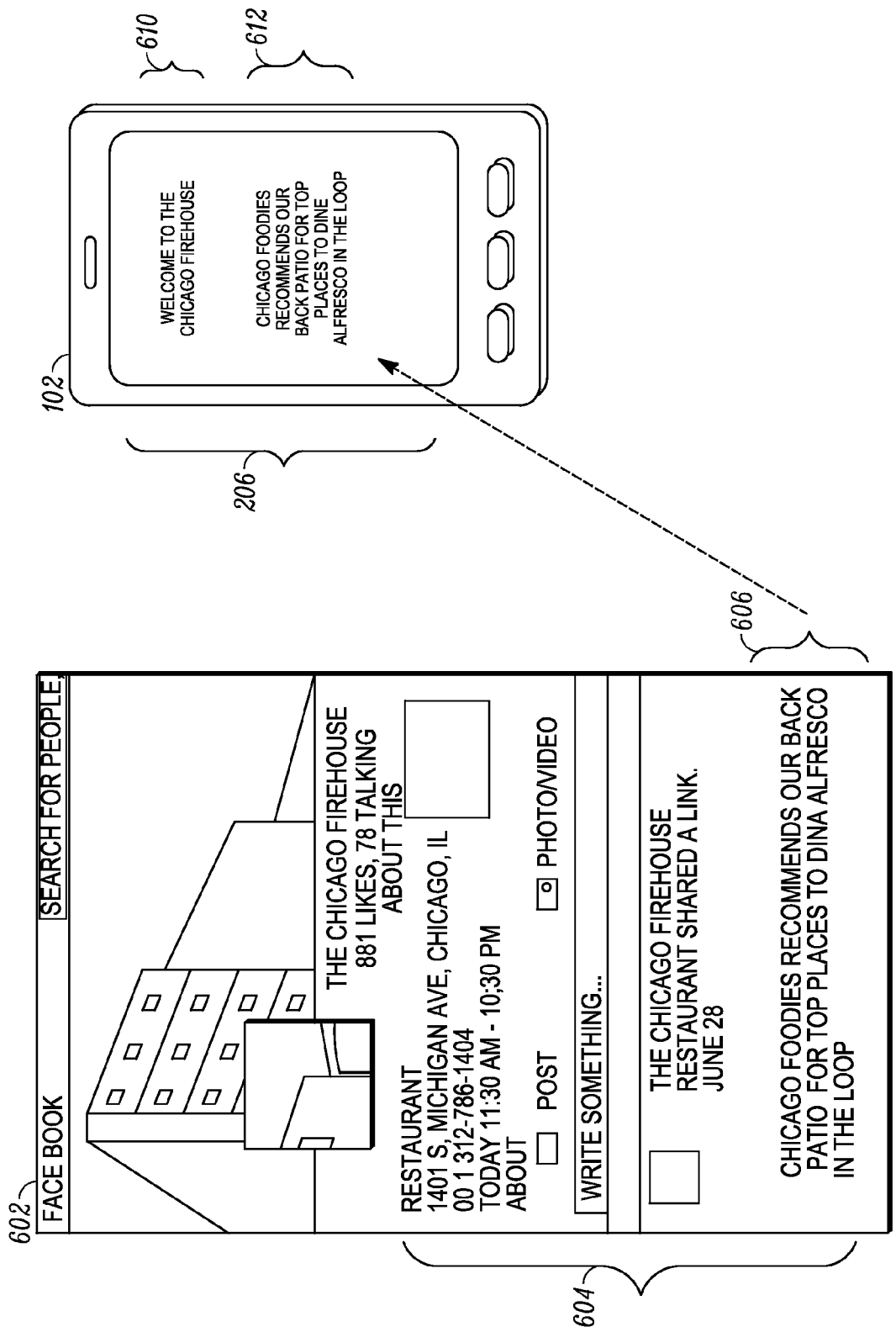
FIG. 6 illustrates example screenshots of a social networking site and a wireless device displaying a message that is based on the social networking site content.

Screenshots of an example social networking site 602 and a wireless device 102 displaying a message 206 that is based on the social networking site content 604 is illustrated in FIG. 6. In this example, a Facebook page 602 associated with a restaurant called "The Chicago Firehouse" includes overall social networking content 604 and a subset of the social networking content 606. In an example, the subset 606 is the most recent post by the company on the social networking site. The wireless device 102 displays a message 206 generated based on the social networking content 604. In this example, the message 206 includes a first message portion 610 and a second message portion 612. The first message portion 610 includes canned text "Welcome to the Chicago Firehouse" retrieved from a database 108 based on the network identifier, and the second message portion 612 includes text parsed from the Facebook page 602 (e.g., the latest post).

Figure 7:
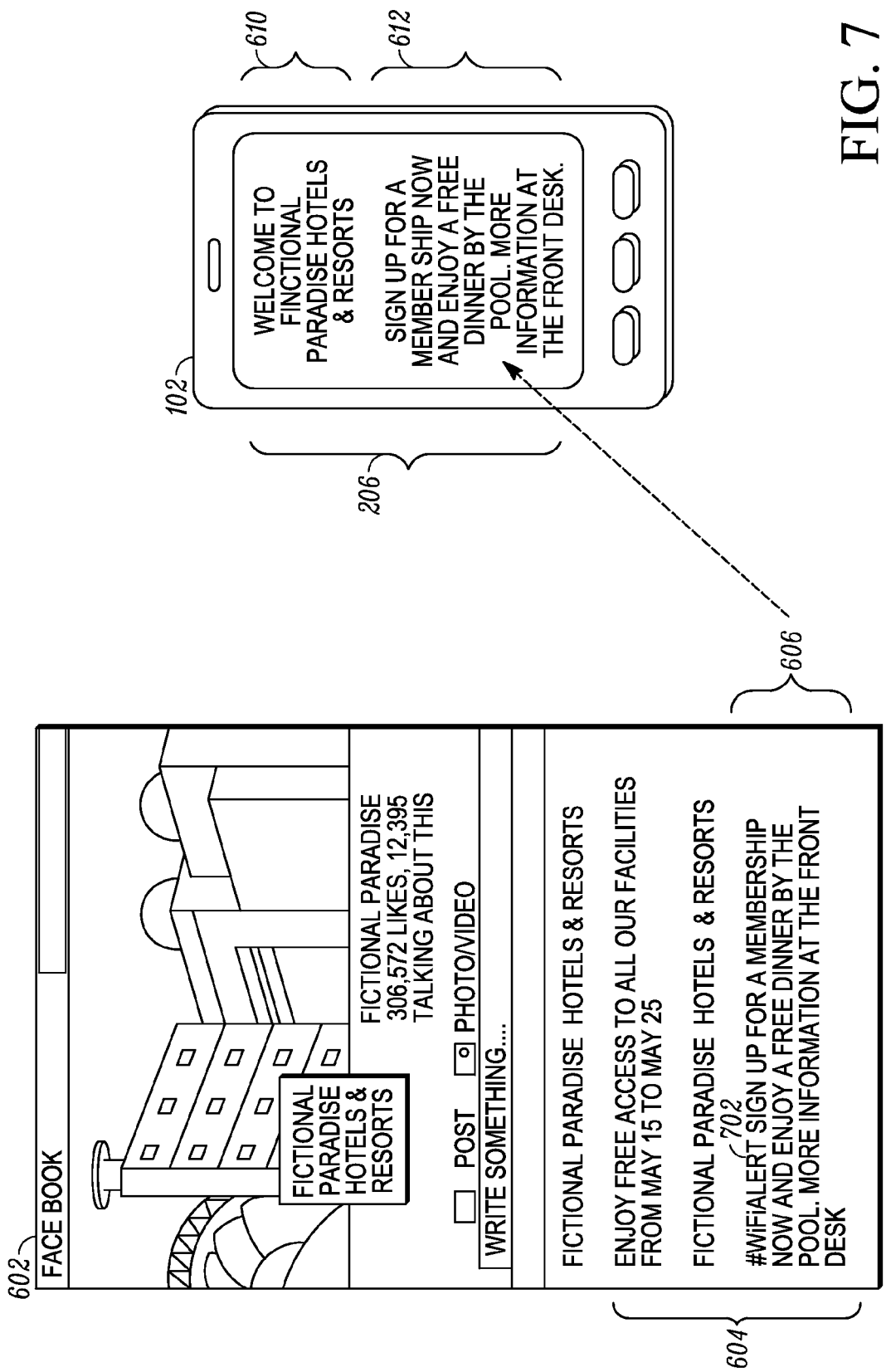
FIG. 7 illustrates additional example screenshots of a social networking site and a wireless device displaying a message that is based on the social networking site content.

Additional screenshots of an example social networking site 602 and a wireless device 102 displaying a message 206 that is based on the social networking site content 604 is illustrated in FIG. 7. In this example, another Facebook page 602 associated with a hotel called "Fictional Paradise" includes overall social networking content 604 and a subset of the social networking content 606. In an example, the subset 606 is identified by a hash tag 702. The wireless device 102 displays a message 206 generated based on the social networking content 604. In this example, the message 206 includes a first message portion 610 and a second message portion 612. The first message portion 610 includes canned text "Welcome to Fictional Paradise Hotels and Resorts" retrieved from a database 108 based on the network identifier, and the second message portion 612 includes text parsed from the Facebook page 602 based on the hash tag 702.

Figure 8:
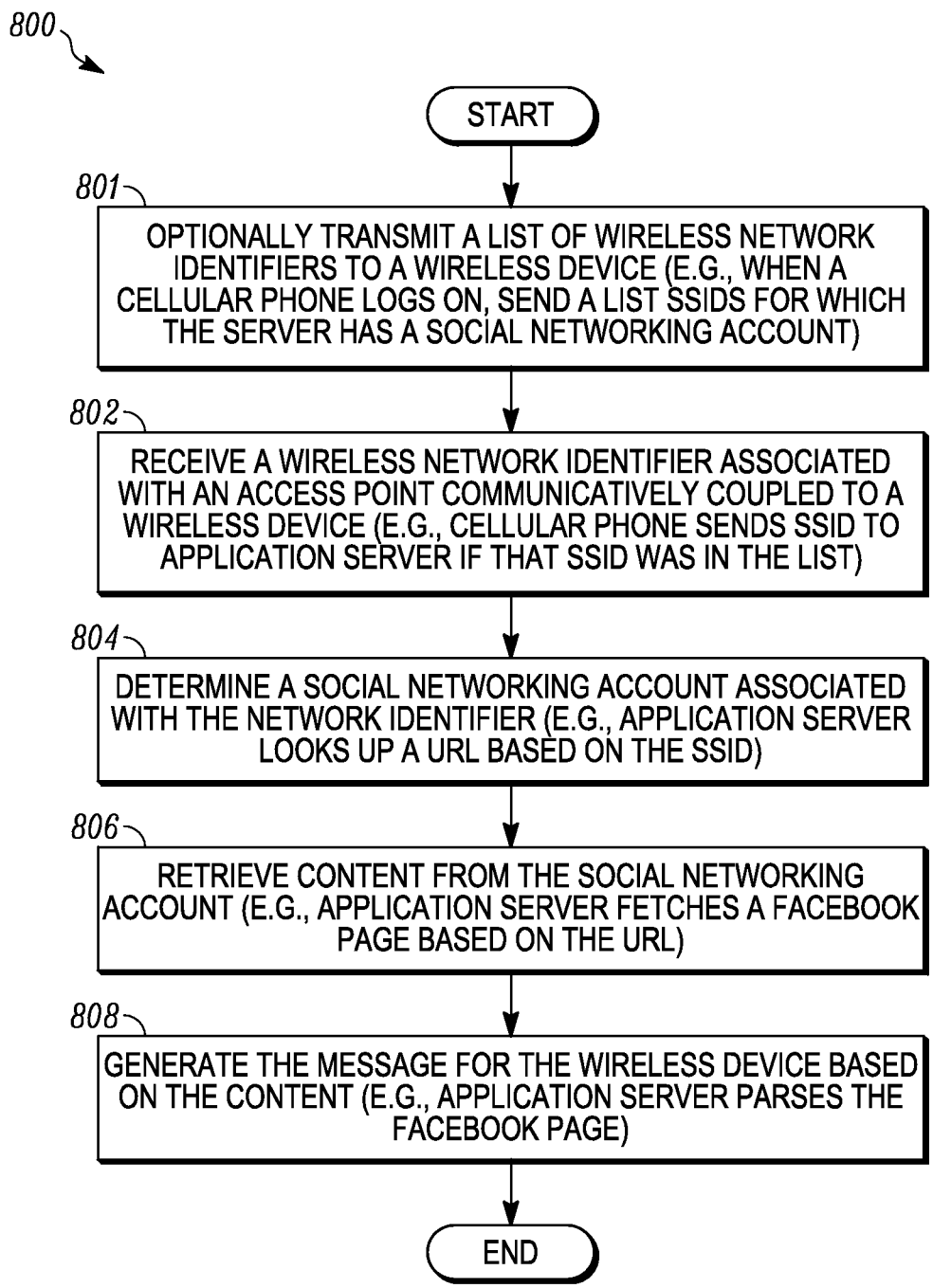
FIG. 8 is a flowchart of an example process for generating a message for a wireless device.

A flowchart of an example process 800 for generating a message for a wireless device is illustrated in FIG. 8. The process 800 may be carried out by one or more suitably programmed processors such as a CPU executing software (e.g., block 304 of FIG. 3). The process 800 may also be embodied in hardware or a combination of hardware and hardware executing software. Suitable hardware may include one or more application specific integrated circuits (ASICs), state machines, field programmable gate arrays (FPGAs), digital signal processors (DSPs), and/or other suitable hardware. Although the process 800 is described with reference to the flowchart illustrated in FIG. 8, it will be appreciated that many other methods of performing the acts associated with process 800 may be used. For example, the order of many of the operations may be changed, and some of the operations described may be optional.

The example process 800 begins when a server 106 optionally transmits a list of wireless network identifiers to a wireless device 102 (block 801). For example, when a cellular phone logs on (e.g. over 3G or LTE), the server 106 may send a list SSIDs for which the server 106 has a social networking account). Alternatively, or in addition, the wireless device 102 may be preconfigured with one or more wireless network identifiers. Subsequently, the server 106 receives a wireless network identifier associated with an access point 202 that is communicatively coupled to a wireless device 102 (block 802). In an example, a cellular phone sends an SSID to an application server 106. Preferably, the wireless device 102 only sends the SSID when the SSID is included in the received list of SSIDs. This prevents the wireless device 106 from sending SSIDs to the application server 106, for which the application server 106 has no associated social networking account.

The server 106 then determines a social networking account associated with the network identifier (block 804). In an example, the application server 106 looks up a uniform resource locator (URL) based on the SSID. The server 106 then retrieves content from the social networking account (block 806). In an example, the application server 106 fetches a Facebook page based on the URL. The server 106 then generates the message for the wireless device 102 based on the content (block 808). In an example, the application server 106 parses the Facebook page.

As an example of how the order of the operations may be changed, an application server 106 may retrieve content from a social networking account prior to a cellular phone sending an SSID associated with that content. In addition, the application server 106 may parse certain social networking content prior to a cellular phone sending an SSID associated with that content (e.g., pre-parse popular content in anticipation of needing it for messaging).

Figure 9:
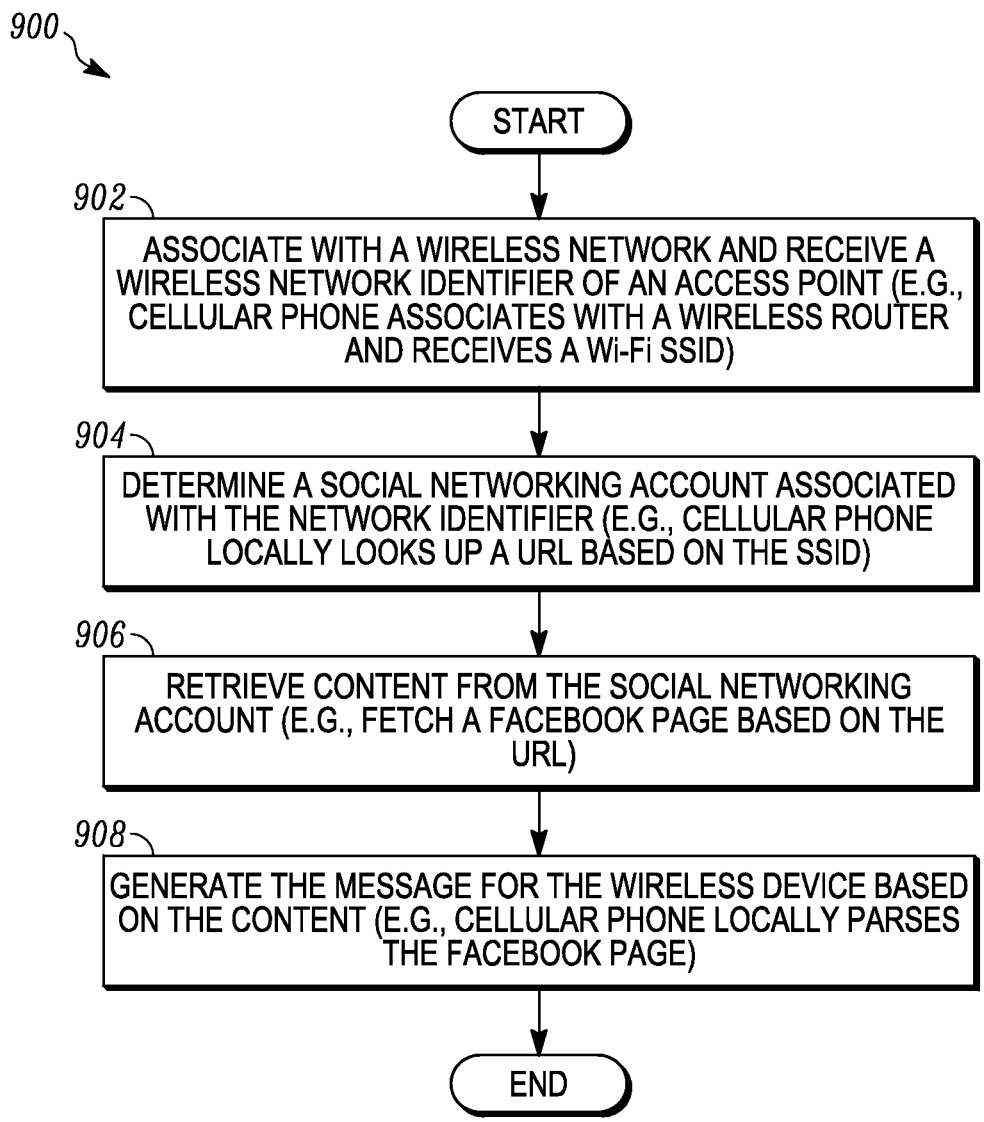
FIG. 9 is another flowchart of another example process for generating a message for a wireless device.

A flowchart of another example process 900 for generating a message for a wireless device is illustrated in FIG. 9. The process 900 may be carried out by one or more suitably programmed processors such as a CPU executing software (e.g., block 304 of FIG. 3). The process 900 may also be embodied in hardware or a combination of hardware and hardware executing software. Suitable hardware may include one or more application specific integrated circuits (ASICs), state machines, field programmable gate arrays (FPGAs), digital signal processors (DSPs), and/or other suitable hardware. Although the process 900 is described with reference to the flowchart illustrated in FIG. 9, it will be appreciated that many other methods of performing the acts associated with process 900 may be used. For example, the order of many of the operations may be changed, and some of the operations described may be optional.

The example process 900 begins when a wireless device 102 associates with a wireless network and receives a wireless network identifier of an access point 202 (block 802). In an example, a cellular phone associates with a wireless router 202 and receives a Wi-Fi SSID. The wireless device 102 then determines a social networking account associated with the network identifier (block 904). In an example, the wireless device 102 locally looks up a uniform resource locator (URL) based on the SSID if the SSID is in the list received from the server 106. The wireless device 102 then retrieves content from the social networking account (block 906). In an example, the wireless device 102 fetches a Facebook page based on the URL. The wireless device 102 then generates the message for the wireless device 102 based on the content (block 908). In an example, the wireless device 102 parses the Facebook page.

As an example of how the order of the operations may be changed, a wireless device 102 may retrieve content from a social networking account prior receiving a particular Wi-Fi SSID associated with that content. In addition, the wireless device 102 may parse certain social networking content prior to receiving the Wi-Fi SSID associated with that content (e.g., pre-parse popular content in anticipation of needing it for messaging).

Figure 10:
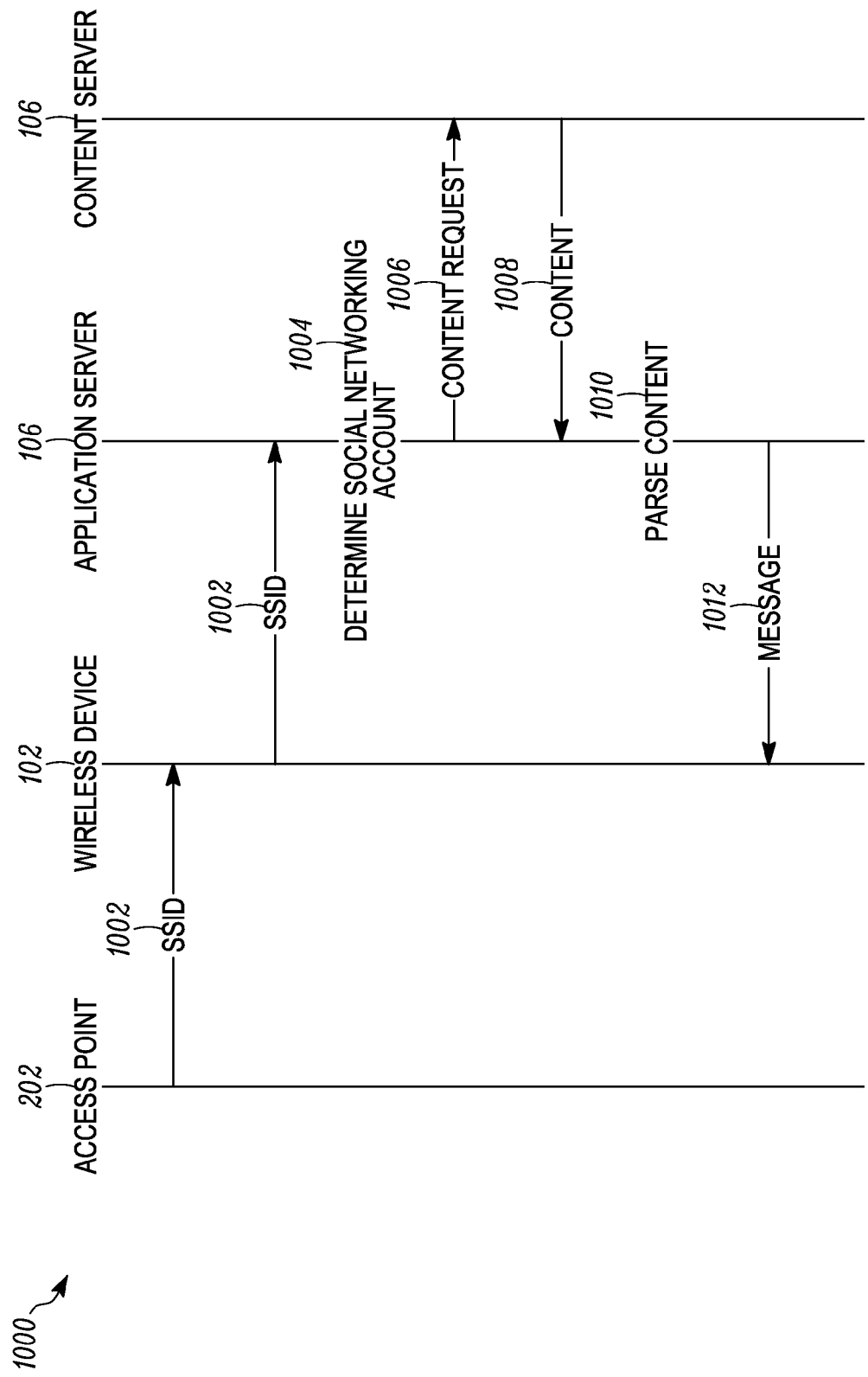
FIG. 10 is a messaging diagram of example process for generating a message for a wireless device.

A messaging diagram of example process 1000 for generating a message for a wireless device 102 is illustrated in FIG. 10. In this example, an access point 202 transmits an SSID 1002 to a wireless device 102 (e.g., when the wireless device is associating with the access point 202 or when the wireless device performs WiFi scanning to identify available access points). The wireless device 102 then transmits the SSID 1002 to an application server 106 if the SSID is in the list received from the server 106. The application server 106 determines a social networking account 1004 based on the SSID, and transmits a content request 1006 to a content server 106 associated with the social networking account. For example, the application server 106 may determine that the SSID is associated with ABC Hotel and request one or more Facebook posts from the ABC Hotel Facebook page. The content server 106 then transmits the requested content 1008 to the application server 106, and the application server 106 parses the content 1010 to form at least part of the message. For example, the application server 106 may filter the content based on posted date, keywords, poster's name, hash tags, and/or any other suitable criteria. In addition, the application server 106 may add other content to the message such as template text (e.g., "Welcome to [company name]" and/or a hyperlink (e.g., "Click here to view a coupon"). Once the application server 106 generates the message based on the social networking content, the application server 106 transmits the message to the wireless device 102 for display.

In summary, methods and apparatus for generating a message for a wireless device have been disclosed. Among other advantages, wireless devices using hotspots that do not support browser based redirection to welcome pages may display these messages as welcome messages. In addition, updated messages may be pushed to the wireless devices during the hotspot session. For example, messages may be pushed to the wireless devices when the social networking content changes while the wireless device is connected to the hotspot associated with the social networking content. Because the content of the messages is derived from the hotspot provider's social networking account, the messages may be pushed to the wireless device with no additional effort or cooperation needed by the hotspot provider.

The foregoing description has been presented for the purposes of illustration and description. It is not intended to be exhaustive or to limit the invention to the exemplary embodiments disclosed. Many modifications and variations are possible in light of the above teachings. It is intended that the scope of the invention be limited not by this detailed description of examples, but rather by the claims appended hereto.

What is claimed is:

1. A method of generating a message for a wireless device, the method comprising:
    storing a list of wireless network identifiers at the wireless device;
    receiving a wireless network identifier included in the list of wireless network identifiers, wherein the network identifier is associated with an access point communicatively coupled to the wireless device;
    determining a social networking account associated with the network identifier;
    retrieving content from a network based on the social networking account; and
    generating the message for the wireless device based on the content, wherein generating the message includes parsing the content based on at least one keyword.

2. The method of claim 1, further comprising transmitting the list of wireless network identifiers to the wireless device.

3. The method of claim 1, wherein receiving the wireless network identifier includes receiving a Service Set Identifier (SSID).

4. The method of claim 1, wherein determining the social networking account includes determining a uniform resource locator (URL).

5. The method of claim 1, wherein retrieving content from the social networking account includes retrieving web page content.

6. The method of claim 1, wherein generating the message includes inserting a hyperlink in the message.

7. The method of claim 1, further comprising sending the message to the wireless device.

8. The method of claim 7, further comprising updating the message at the wireless device.

9. The method of claim 7, wherein sending the message to the wireless device includes using a messaging push server.

10. A method of generating a message for a wireless device, the method comprising:
    storing a list of wireless network identifiers at the wireless device;
    receiving a wireless network identifier included in the list of wireless network identifiers, wherein the network identifier is associated with an access point communicatively coupled to the wireless device;
    determining a social networking account associated with the network identifier;
    retrieving content from a network based on the social networking account; and
    generating the message for the wireless device based on the content, wherein generating the message includes filtering the content based on a posted date.

11. A method of generating a message for a wireless device, the method comprising:
    storing a list of wireless network identifiers at the wireless device;
    receiving a wireless network identifier included in the list of wireless network identifiers, wherein the network identifier is associated with an access point communicatively coupled to the wireless device;
    determining a social networking account associated with the network identifier;
    retrieving content from a network based on the social networking account; and
    generating the message for the wireless device based on the content, wherein generating the message includes filtering the content based on a user associated with posting the content.

12. An apparatus for generating a message for a wireless device, the apparatus comprising:
    a receiver structured to receive a wireless network identifier included in a list of wireless network identifiers, wherein the network identifier is associated with an access point communicatively coupled to the wireless device;
    a controller operatively coupled to the receiver, the controller being structured to determine a social networking account associated with the network identifier; and
    a network interface operatively coupled to the controller, the network interface being structured to retrieve content from a network based on the social networking account;
    wherein the controller generates the message for the wireless device based on the retrieved content and wherein the controller is structured to generate the message by parsing the content based on at least one keyword.

13. The apparatus of claim 12, further comprising a transmitter operatively coupled to the controller, the transmitter being structured to transmit the list of wireless network identifiers to the wireless device.

14. The apparatus of claim 12, wherein the receiver is structured to receive a Service Set Identifier (SSID).

15. The apparatus of claim 12, wherein the controller is structured to lookup a uniform resource locator (URL) based on the network identifier.

16. The apparatus of claim 12, wherein the controller is structured to lookup a social networking account based on the network identifier.

17. The apparatus of claim 12, wherein the network interface is structured to retrieve web page content based on the social networking account.

18. The apparatus of claim 12, wherein the controller is structured to generate the message by inserting a hyperlink in the message.

19. The apparatus of claim 12, further comprising a transmitter operatively coupled to the controller, the transmitter being structured to send the message to the wireless device.

20. The apparatus of claim 19, wherein the transmitter is structured to update the message at the wireless device.

21. The apparatus of claim 19, wherein the transmitter is part of a messaging push server.

22. An apparatus for generating a message for a wireless device, the apparatus comprising:
- a receiver structured to receive a wireless network identifier included in a list of wireless network identifiers, wherein the network identifier is associated with an access point communicatively coupled to the wireless device;
- a controller operatively coupled to the receiver, the controller being structured to determine a social networking account associated with the network identifier; and
- a network interface operatively coupled to the controller, the network interface being structured to retrieve content from a network based on the social networking account;
- wherein the controller generates the message for the wireless device based on the retrieved content and wherein the controller is structured to generate the message by filtering the content based on a posted date.

23. An apparatus for generating a message for a wireless device, the apparatus comprising:
- a receiver structured to receive a wireless network identifier included in a list of wireless network identifiers, wherein the network identifier is associated with an access point communicatively coupled to the wireless device;
- a controller operatively coupled to the receiver, the controller being structured to determine a social networking account associated with the network identifier; and
- a network interface operatively coupled to the controller, the network interface being structured to retrieve content from a network based on the social networking account;
- wherein the controller generates the message for the wireless device based on the retrieved content and wherein the controller is structured to generate the message by filtering the content based on a user associated with posting the content.

24. A method of generating a message for a wireless device, the method comprising:
- storing a list of Service Set Identifiers (SSIDs) at the wireless device;
- receiving a Service Set Identifier (SSID) included in the list Service Set Identifiers (SSIDs), wherein the Service Set Identifier (SSID) is associated with an access point communicatively coupled to the wireless device;
- determining a uniform resource locator (URL) associated with the Service Set Identifier (SSID);
- retrieving web page content based on the uniform resource locator (URL);
- generating the message for the wireless device based on the content by parsing the content based on at least one keyword and filtering the content based on a posted date;
- inserting a hyperlink in the message; and
- sending the message to the wireless device.

25. The method of claim 24, further comprising transmitting the list of Service Set Identifiers (SSIDs) to the wireless device.

* * * * *